United States Patent [19]
Pettitt et al.

[11] Patent Number: 5,475,385
[45] Date of Patent: Dec. 12, 1995

[54] ANALOGUE TELEMETRY SYSTEM AND METHOD FOR FAULT DETECTION IN OPTICAL TRANSMISSION SYSTEMS

[75] Inventors: Martin J. Pettitt, Clayton, Australia; Anagnostis Hadjifotiou, Harlow, United Kingdom

[73] Assignee: Northern Telecom Limited, Montreal, Canada

[21] Appl. No.: 154,631

[22] Filed: Nov. 18, 1993

Related U.S. Application Data

[63] Continuation of Ser. No. 715,339, Jun. 14, 1991, abandoned.

[30] Foreign Application Priority Data

Jun. 16, 1990 [GB] United Kingdom ............... 9013512

[51] Int. Cl.$^6$ .................................................. G08B 21/00
[52] U.S. Cl. ........................... 340/870.09; 340/825.16; 359/174; 359/341; 371/20.2; 372/6; 372/26; 372/28
[58] Field of Search .................. 340/825.16, 825.71, 340/870.09, 870.26; 455/8, 67.1; 359/110, 174, 176, 177, 341, 344, 345; 379/2, 4, 22, 26; 370/13.1, 14; 371/20.1, 20.2, 20.3; 372/6, 28, 38, 26

[56] References Cited

U.S. PATENT DOCUMENTS

| | | | |
|---|---|---|---|
| 3,766,393 | 10/1973 | Herzog et al. | 372/26 |
| 4,406,919 | 9/1983 | Pospischil | 371/20.2 |
| 4,468,773 | 8/1984 | Seaton | 372/28 |
| 4,733,397 | 3/1988 | Gallagher et al. | 372/26 |
| 5,007,698 | 4/1991 | Sasaki et al. | 359/341 |
| 5,039,199 | 8/1991 | Mollenauer et al. | 359/341 |
| 5,088,095 | 2/1992 | Ziringibl | 372/6 |

FOREIGN PATENT DOCUMENTS

| | | | |
|---|---|---|---|
| 415438 | 8/1989 | European Pat. Off. | 359/174 |
| 0331304 | 9/1989 | European Pat. Off. | |
| 1211275 | 2/1966 | Germany . | |
| 57-5447 | 1/1982 | Japan | 371/20.2 |

Primary Examiner—John K. Peng
Assistant Examiner—Andrew Hill
Attorney, Agent, or Firm—Lee, Mann, Smith, McWilliams, Sweeney & Ohlson

[57] ABSTRACT

An analogue telemetry system/method provides fault location in an optical transmission system including optical fibre amplifiers. Each amplifier has a respective optical pump source including an AGC loop around the optical amplifier's fibre. Spontaneous emission from the optical fibre amplifier is detected and employed to drive the respective pump source to maintain the amplifier output at a predetermined level. A supervisory tone is applied at the transmission end of the system and its presence/absence detected at each amplifier. In the event of "absence", a respective distress tone is applied at the relevant amplifier. At the receiver end of the system, the supervisory tone is sought and in the absence, the number of distress tones, if any present, is counted and the position of the fault is thus determined.

6 Claims, 2 Drawing Sheets

5,475,385

ANALOGUE TELEMETRY SYSTEM AND METHOD FOR FAULT DETECTION IN OPTICAL TRANSMISSION SYSTEMS

This application is a continuation of application Ser. No. 07/715,339, filed Jun. 14, 1991, abandoned.

BACKGROUND OF THE INVENTION

This invention relates to telemetry and in particular to analogue telemetry systems and methods for concatenated optical amplifier systems.

Optical amplifiers such as those based on specially doped fibres or semiconductor materials are likely to be employed in future long haul optical fibre cable transmission routes since they can provide considerable enhancement thereto. They will be able to directly amplify the optical signal and therefore simplify the intermediate repeater stages by eliminating the need to perform full 3R (re-shaping, re-timing, re-generation) signal transmission. A system including a plurality of optical amplifiers should have some facility for diagnosing where a fault has occurred and referring this information to one of the terminal stations of the system.

SUMMARY OF THE INVENTION

According to one aspect of the present invention there is provided an analogue telemetry system for use with an optical transmission system including a transmission terminal, a plurality of concatenated optical amplifiers and a receiver terminal, all interconnected by optical fibre, the telemetry system including means for applying a supervisory tone to the optical output from the transmission terminal, means at each optical amplifier for detecting the presence of the supervisory tone or its absence in the event of a transmission system fault, and in the event of absence of the supervisory tone applying a respective distress tone to the amplifier's output, and means at the receiver terminal for detecting the presence of the supervisory tone, one or more distress tones, or the absence of all such tones, the latter or the the number of any said received distress tones serving to locate the system fault.

According to another aspect of the present invention there is provided an analogue telemetry method for use with an optical transmission system including a transmission terminal, a plurality of concatenated optical amplifiers and a receiver terminal, all interconnected by optical fibre, the method including the steps of applying a supervisory tone to the optical output from the transmission terminal, detecting the presence/absence of the supervisory tone at each optical amplifier, the said absence corresponding to a transmission system fault, applying a respective distress tone to the amplifier's output in the event of said absence, detecting at the receiver terminal the presence of the supervisory tone, one or more said distress tones, or the absence of all such tones, and determining from the latter or the number of said received distress tones the location of the system fault.

BRIEF DESCRIPTION OF THE DRAWINGS

Embodiments of the invention will now be described with respect to the accompanying drawings, in which.

DESCRIPTION OF THE PREFERRED EMBODIMENTS

Figure 1:
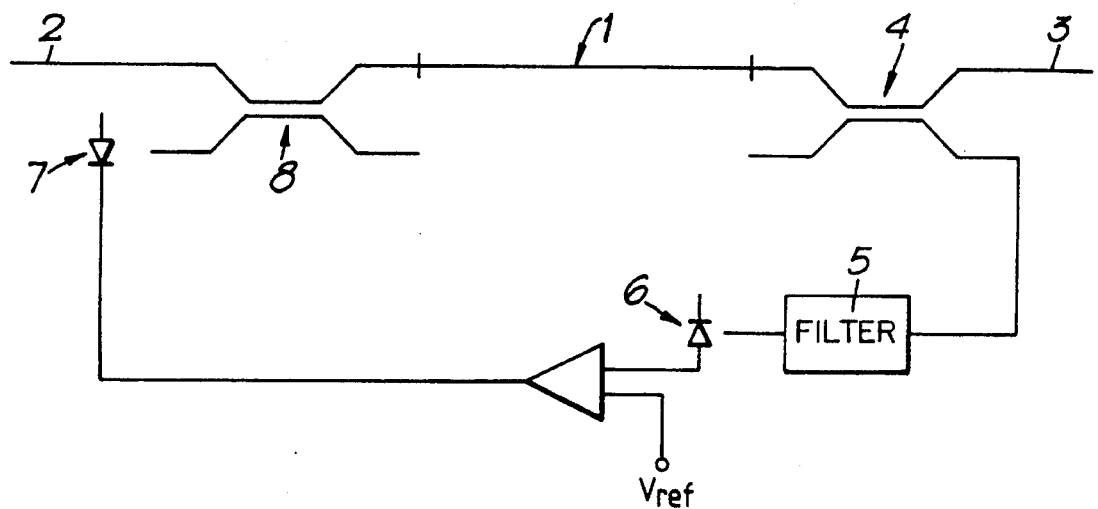
FIG. 1 illustrates a fibre amplifier and a simple AGC therefor.

In a long haul optical fibre transmission system there are many parameters, such as fibre section loss and fibre to amplifier coupling, which will have tolerance placed upon them. Therefore the exact gain required from each stage of the system will need to be adjusted to maintain the signal on the amplifier output at the desired level. This requires some form of signal automatic gain control (AGC) around each individual amplifier. A simple form of AGC loop is shown in FIG. 1 for an optical fibre amplifier 1, typically an erbium doped silica optical fibre amplifier. A received optical signal, which was transmitted from a transmitter laser (not shown) at a terminal station, is input at 2 and the amplified optical signal is output at 3. A small portion of the output from the amplifier is tapped off via fibre coupler 4 and applied to a narrowband optical filter 5 which serves to filter the spontaneous emission therefrom. This spontaneous emission, detected at 6, is used to drive pump laser 7. The optical output of pump laser 7 is coupled to the amplifying fibre 1 via a fibre coupler 8. In the simple AGC implementation illustrated in FIG. 1, the voltage produced by the detected spontaneous emission is merely compared with a reference voltage and the pump laser driven appropriately.

Figure 2:
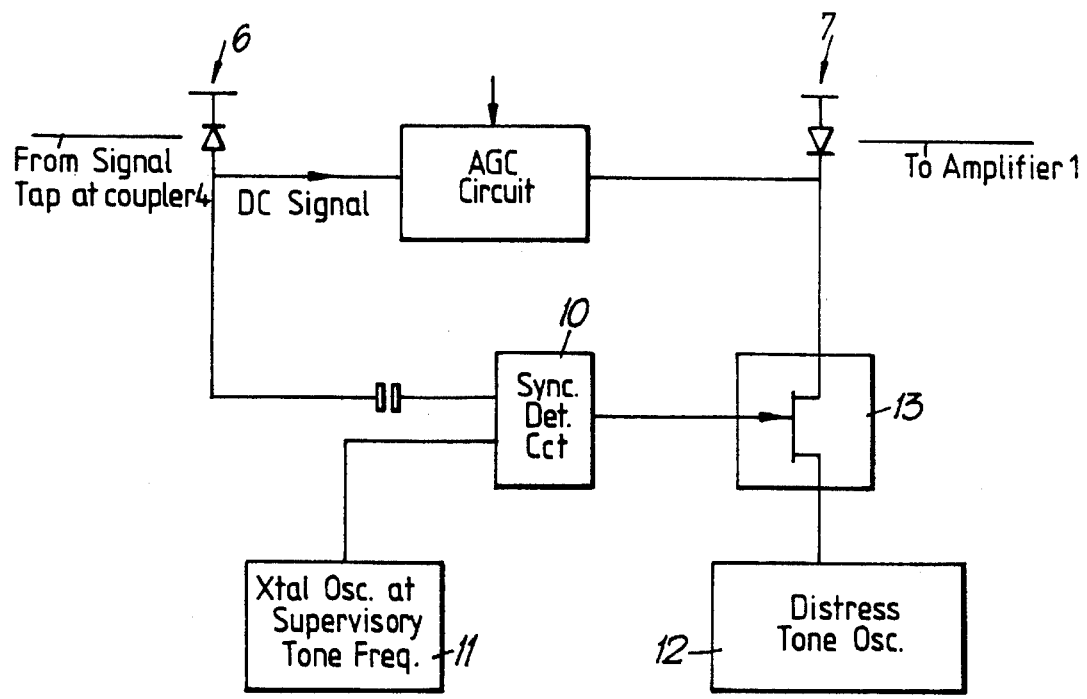
FIG. 2 illustrates an analogue telemetry system for an optical fibre amplifier.

The telemetry system proposed by the present invention can be implemented in conjunction with an optical AGC loop such as that described with reference to FIG. 1. The telemetry and AGC circuitry required at the optical amplifier is shown in FIG. 2, which uses the same reference numerals as FIG. 1 where appropriate. A supervisory tone is superimposed on the optical data at a frequency around 100 kHz. This is just above the crosstalk cut off frequency of the optical amplifier (fibre 1) and therefore will not affect the optical gain control system through interaction with the pump. The supervisory tone is applied at the transmitter laser (not shown) of the terminal station. The supervisory tone can be picked out from a signal tap, such as through the narrowband filter 5 and detector 6 which are used to detect the signal for AGC purposes. The frequency of the detected tone is compared in a synchronous detection circuit 10 with that output by a crystal 11 oscillating at the supervisory tone frequency. If the frequencies are the same the presence of the supervisory tone is confirmed and thus that there is a continuous optical path up to that specific amplifier. In this case the supervisory tone and the optical data signal are both optically amplified and output at 3 for transmission down the line (optical transmission fibre) to the next amplifier.

If the supervisory tone is not detected at an amplifier it is implied that the optical path to that amplifier is not continuous. The amplifier then needs to alert the terminal of the fault and it can do this by sending out a distress tone, at a frequency different to the supervisory tone, to the subsequent amplifiers in the system. This can be done by superimposing a low frequency modulation, such as generated by a distress tone oscillator 12, onto the amplifier pump laser 7, which in turn gets transferred to the spontaneous emission from the fibre amplifier 1 and relayed down the line (transmission fibre) to the receiving terminal station. The synchronisation detection circuit 10 serves to hold open a latch (switch unit) 13 while the supervisory tone is present. When the supervisory tone is not detected, the latch switches in the distress tone oscillator 12 to apply the distress tone modulation to the pump laser 7. The distress tones are unique to each amplifier. Because the main supervisory tone will also be absent from the subsequent amplifiers, they too will generate a respective distress tone. Since the distress tones are unique to each amplifier, the exact system section can be determined in which the fault occurs by analysing the frequency spectrum of the supervisory channel as received at the terminal station.

Figure 3:
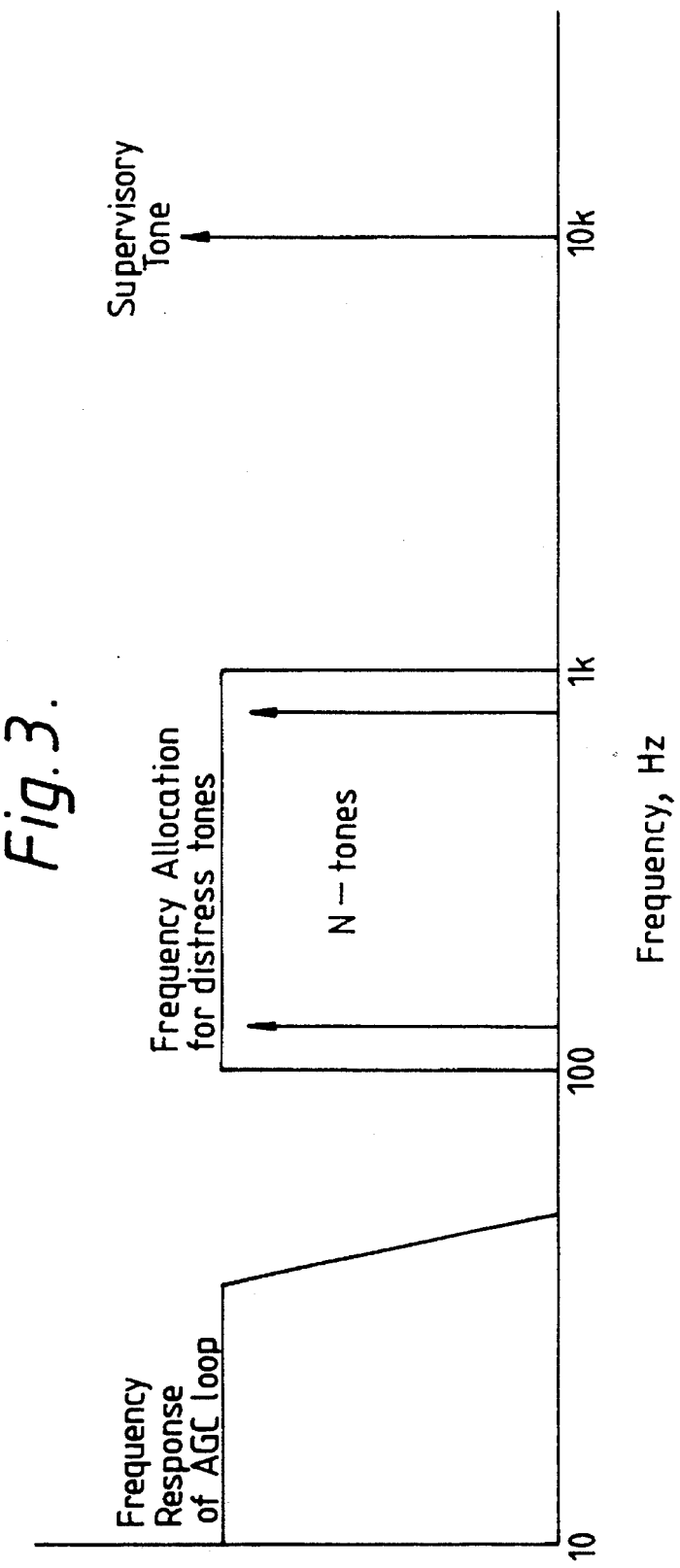
FIG. 3 illustrates a possible telemetry frequency allocation spectrum.
Figure 4:
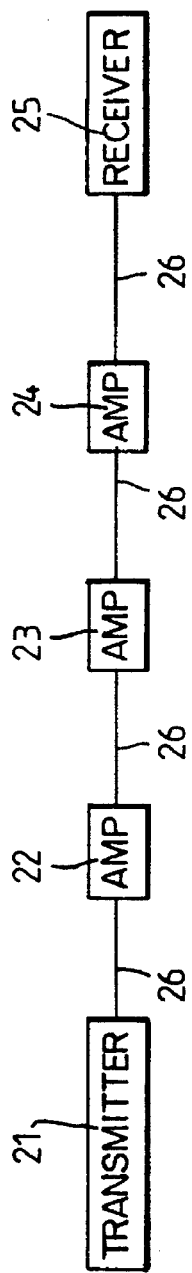
FIG. 4 illustrates, schematically, an optical transmission system.

The frequency allocation of the tones needs to be carefully determined. It should be above the AGC control loop bandwidth and below the frequency at which pump modulation is no longer transferred to the spontaneous output. A possible frequency allocation range is illustrated in FIG. 3. FIG. 4 illustrates the optical transmission system to which the invention is applicable. It comprises a transmission terminal 21, optical amplifiers 22, 23, 24, and a receiver terminal 25, all interconnected by optical fibre 26.

To summarise, the analogue telemetry system/method described above involves superimposing a continuous tone upon the data output from an optical transmitter at a terminal station of the system. Each amplifier in the system has an optical receiver which detects whether this tone is present or absent. If the tone is detected the system is continuous up to that amplifier. If the tone is absent each amplifier is able to superimpose a unique distress tone upon the amplifier pump source. The receiving terminal station scans the appropriate frequency range to determine if the supervisory tone is present and if not, it finds how many distress tones are present to accurately locate the system fault. In the event of system failure between the last amplifier and the receiver terminal no supervisory or distress tone will be received. In this way fault location on very long haul optical systems, such as submarine systems, containing optical amplifiers can be achieved.

Attention is directed to our co-pending GB Application No 9013513.8 (Serial No 2245121A) M. J. Pettit-A. J. Hadjifotiou 4-3) (corresponding to U.S. patent application Ser. No. 07/715,338 filed Jun. 14, 1991) which discloses an alternative analogue telemetry method/system.

We claim:

1. An analogue telemetry system for use with an optical transmission system including a transmitter terminal having an optical output, a plurality of concatenated optical fibre amplifiers and a receiver terminal all interconnected by optical fibre, each optical fibre amplifier having a respective optical pump source comprising a laser included in an automatic gain control (AGC) loop around the optical fibre amplifier's fibre, wherein in the AGC loop spontaneous emission from the optical fibre amplifier is detected and employed to drive the respective laser pump source appropriately to maintain the optical fibre amplifier output at a predetermined level, the telemetry system including means for applying a supervisory tone to the output of the transmitter terminal, means at each said optical amplifier for detecting the presence of the supervisory tone or its absence in the event of a transmission system fault, and in the event of absence of the supervisory tone applying a respective distress tone at a frequency unique to that amplifier and different from that of the supervisory tone to the optical fibre amplifier's output by superimposing a respective low frequency modulation onto the respective laser pump source, which respective modulation is in turn transferred to the optical amplifier fibre's spontaneous emission, each optical fibre amplifier which detects an absence of the supervisory tone thereby applying its own unique distress tone to its amplified output so that multiple distress tone may be transmitted to the receiver terminal, and spectrum analyser means disposed at the receiver terminal for detecting the presence of the supervisory tone, one or more said distress tones, or the absence of all such tones, the latter or the number of any detected distress tones serving to locate a system fault.

2. A telemetry system as claimed in claim 1, wherein the tone detecting means at the optical fibre amplifiers includes a synchronous detector.

3. A telemetry system as claimed in claim 2 further including a respective supervisory tone frequency generator at each amplifier which is coupled to the synchronous detector, and a switch unit which is held open by the synchronous detector when the supervisory tone is present but which is closed when the supervisory tone is absent, when it serves to connect a distress tone generator to the optical pump source of the respective optical fibre amplifier.

4. A telemetry system as claimed in claim 1, wherein the distress tones are within a frequency band above the optical amplifier AGC loop bandwidth and below the frequency at which the pumps' modulation is no longer transferred to the spontaneous emission from the optical fibre amplifiers.

5. An analogue telemetry method for use with an optical transmission system including a transmitter terminal having an optical output, a plurality of concatenated optical fibre amplifiers and a receiver terminal all interconnected by optical fibre, each optical fibre amplifier having a respective optical pump source comprising a laser included in an automatic gain control (AGC) loop around the optical fibre amplifier's fibre, the method including the steps of detecting in the AGC loops spontaneous emission from the optical amplifiers fibres and employing the detected spontaneous emission to drive the respective laser pump sources appropriately to maintain the optical fibre amplifier's output at a predetermined level, applying a supervisory tone to the optical output from the transmitter terminal, detecting the presence/absence of the supervisory tone at each said optical fibre amplifier, the absence of the supervisory tone corresponding to a system fault, applying in the event of said absence a distress tone at a frequency unique to that amplifier and different from that of the supervisory tone to the optical fibre amplifier's output by superimposing a respective low frequency modulation onto the respective laser pump source, which respective modulation is in turn transferred to the optical amplifier fibre's spontaneous emission, each optical fibre amplifier which detects an absence of the supervisory tone thereby applying its own unique distress tone to its amplified output so that multiple distress tone may be transmitted to the receiver terminal, analysing the spectrum of signals received at the receiver terminal so as to determine the presence of the supervisory tone, one or more said distress tones, or the absence of all such tones, and determining from the latter or the number of received distress tones the location of a system fault.

6. A method as claimed in claim 5, wherein the presence/absence of the supervisory tone is detected by a synchronous detector.

* * * * *